United States Patent [19]

Halasa et al.

[11] Patent Number: 5,627,237
[45] Date of Patent: May 6, 1997

[54] TIRE TREAD CONTAINING 3,4-POLYISOPRENE RUBBER

[75] Inventors: Adel F. Halasa, Bath; Wen-Liang Hsu, Cuyahoga Falls; David J. Zanzig, Uniontown; Gerald L. Allen, Mogadore; Laurie E. Austin, Hartville, all of Ohio

[73] Assignee: The Goodyear Tire & Rubber Company, Akron, Ohio

[21] Appl. No.: 642,180

[22] Filed: May 6, 1996

[51] Int. Cl.$^6$ .................. C08L 9/00; C08L 9/06; B60C 9/02
[52] U.S. Cl. .................. 525/236; 525/237; 152/209 R
[58] Field of Search .................. 525/237, 236; 152/209 R

[56] References Cited

U.S. PATENT DOCUMENTS

| | | | |
|---|---|---|---|
| 4,963,615 | 10/1990 | Yuto | 525/237 |
| 5,082,901 | 1/1992 | Linster | 525/237 |
| 5,087,668 | 2/1992 | Standstrom et al. | 525/237 |
| 5,104,941 | 4/1992 | Wolpers et al. | 525/237 |
| 5,151,398 | 9/1992 | Hsu et al. | 526/141 |
| 5,194,485 | 3/1993 | Kikuchi et al. | 525/236 |
| 5,239,023 | 8/1993 | Hsu et al. | 526/141 |
| 5,300,577 | 4/1994 | DiRossi et al. | 525/237 |
| 5,356,997 | 10/1994 | Massie et al. | 525/237 |
| 5,405,927 | 4/1995 | Hsu et al. | 525/237 |

*Primary Examiner*—D. R. Wilson
*Attorney, Agent, or Firm*—Alvin T. Rockhill

[57] ABSTRACT

This invention reveals a pneumatic tire having an outer circumferential tread wherein said tread is a sulfur-cured rubber composition comprised of, based on 100 parts by weight of rubber, (1) from about 5 to about 50 parts of 3,4-polyisoprene rubber, wherein said 3,4-polyisoprene rubber has (a) a 3,4-isomer content of from 75 percent to 95 percent, (b) a 1,2-isomer content of from 5 percent to 25 percent, (c) a glass transition temperature from 0° to 25° C. and (d) a number average molecular weight which is within the range of 30,000 to 180,000; and (2) from about 50 to about 95 parts of a rubbery polymer which is co-curable with the 3,4-polyisoprene rubber. The subject invention further discloses a pneumatic tire having an outer circumferential tread wherein said tread is a sulfur-cured rubber composition comprised of, based on 100 parts by weight of rubber, (1) from about 20 to about 60 parts of natural rubber, (2) from about 5 to about 30 parts of high cis-1,4-polybutadiene rubber, (3) from about 10 to about 50 parts of styrene-butadiene rubber, and (4) from about 5 to about 30 parts of 3,4-polyisoprene rubber, wherein the 3,4-polyisoprene rubber has (a) a 3,4-isomer content of from 75 percent to 95 percent, (b) a 1,2-isomer content of from 5 percent to 25 percent, (c) a glass transition temperature from 0° to 25° C. and (d) a number average molecular weight which is within the range of 30,000 to 180,000.

22 Claims, No Drawings

1

TIRE TREAD CONTAINING 3,4-POLYISOPRENE RUBBER

BACKGROUND OF THE INVENTION

It is highly desirable for tires to exhibit good traction characteristics on both dry and wet surfaces. However, it has traditionally been very difficult to improve the traction characteristics of a tire without compromising its rolling resistance and tread wear. Low rolling resistance is important because good fuel economy is virtually always an important consideration. Good tread wear is also an important consideration because it is generally the most important factor which determines the life of the tire.

The traction, tread wear and rolling resistance of a tire are dependent to a large extent on the dynamic viscoelastic properties of the elastomers utilized in making the tire tread. In order to reduce the rolling resistance of a tire, rubbers having a high rebound have traditionally been utilized in making the tire's tread. On the other hand, in order to increase the wet skid resistance of a tire, rubbers which undergo a large energy loss have generally been utilized in the tire's tread. In order to balance these two viscoelastically inconsistent properties, mixtures of various types of synthetic and natural rubber are normally utilized in tire treads. For instance, various mixtures of styrene-butadiene rubber and polybutadiene rubber are commonly used as a rubber material for automobile tire treads. However, such blends are not totally satisfactory for all purposes.

In some cases, 3,4-polyisoprene can be used in tire tread compounds to improve tire performance characteristics, such as traction. For instance, U.S. Pat. No. 5,104,941 discloses a method of improving the wet skid resistance of a rubber mixture for a tire tread, comprising adding from 5 to 35 parts by weight of a 3,4-polyisoprene to from 95 to 65 parts by weight of a sulfur-vulcanizable elastomer containing conventional fillers, oils, auxiliaries and vulcanizing agents, wherein said 3,4-polyisoprene is at least partially incompatible with said sulfur-vulcanizable elastomer and has (a) a 3,4-content from 55 to 75 percent, as determined by NMR spectroscopy, (b) a glass transition temperature from 0° to −25° C., determined by differential scanning calorimetry at a heating rate of 10° C./minute, (c) a number average molecular weight Mn, determined by gel permeation chromatography of 220,000 or higher, and (d) an inhomogeneity U of less than 1.8, the inhomogeneity being defined by the equation U=Mw/Mn−1, where Mw and Mn are determined by gel permeation chromatography. U.S. Pat. No. 5,104,941 further discloses a method for improving the wet skid resistance of a rubber mixture, comprising adding from 5 to 35 parts by weight of a 3,4-polyisoprene to from 95 to 65 parts by weight of a sulfur-vulcanizable elastomer, further containing conventional fillers, oils, auxiliaries or vulcanizing agents, wherein said 3,4-polyisoprene is at least partially incompatible with said sulfur-vulcanizable elastomer and has (a) a 3,4-content of from 55 to 75 percent, determined by NMR spectroscopy, (b) a glass transition temperature from 0° to −25° C., determined by differential scanning colorimetry (calorimetry) at a heating rate of 10° C./minute, (c) a number average molecular weight, determined by gel permeation chromatography, of from 200,000 to 218,000, and (d) an inhomogeneity U of 1.4 or less.

U.S. Pat. No. 5,087,668 and U.S. Pat. No. 5,300,577 disclose a pneumatic tire having an outer circumferential tread where said tread is a sulfur-cured rubber composition composed of, based on 100 parts by weight rubber, (a) about 5 to about 35, preferably about 10 to about 25 parts by weight 3,4-polyisoprene rubber, (b) about 20 to about 60, preferably about 30 to about 55 parts by weight cis 1,4-polyisoprene rubber, and (c) about 10 to about 50 parts by weight of at least one other rubber selected from at least one of solution polymerization formed styrene/butadiene copolymer rubber having a styrene/butadiene ratio in the range of about 5/95 to about 30/70, preferably about 8/92 to about 25/75, emulsion polymerization formed styrene/butadiene copolymer rubber having a styrene/butadiene ratio in the range of about 10/90 to about 60/40, preferably about 15/85 to about 35/65, cis 1,4-polybutadiene rubber, isoprene/butadiene copolymer rubber having an isoprene/butadiene ratio in a range of about 30/70 to about 70/30, styrene/isoprene rubber having a styrene/isoprene ratio in a range of about 10/90 to about 35/65 and styrene/isoprene/butadiene rubber; wherein said 3,4-polyisoprene rubber, in its uncured state, is characterized by having a glass transition temperature (Tg) in the range of about −15° C. to about −20° C, a Mooney (ML1+4) value in the range of about 70 to about 90, preferably about 75 to about 85, and, further, a polymer structure containing about 40 to about 70 percent, preferably about 50 to about 60 percent, 3,4-polyisoprene units, about 30 to about 50 percent 1,4-cis and trans units and about 2 to about 10 percent 1,2-polyisoprene units with the total of its 3,4 and 1,2 units being in the range of about 56 to about 63 percent.

U.S. Pat. No. 5,239,023 and U.S. Pat. No. 5,151,398 disclose a process for the synthesis of 3,4-polyisoprene which comprises polymerizing isoprene monomer in an organic solvent at a temperature which is within the range of about −10° C. to about 100° C. in the presence of a catalyst system which is comprised of (a) an organoiron compound which is soluble in the organic solvent, wherein the iron in the organoiron compound is in the +3 oxidation state, (b) a partially hydrolyzed organoaluminum compound which was prepared by adding a protonic compound selected from the group consisting of water, alcohols and carboxylic acids to the organoaluminum compound and (c) a chelating aromatic amine; wherein the molar ratio of the chelating amine to the organoiron compound is within the range of about 0.1:1 to about 1:1, wherein the molar ratio of the organoaluminum compound to the organoiron compound is within the range of about 5:1 to about 200:1, and wherein the molar ratio of the protonic compound to the organoaluminum compound is within the range of about 0.001:1 to about 0.2:1.

U.S. Pat. Nos. 5,231,153, 5,336,739 and 5,448,003 disclose a process for the synthesis of 3,4-polyisoprene which comprises polymerizing isoprene monomer in an organic solvent in the presence of a catalyst system which is comprised of (a) a lithium initiator and (b) an alkyltetrahydrofurfuryl ether modifier, wherein the alkyl group in the alkyltetrahydrofurfuryl ether modifier contains from 6 to about 10 carbon atoms.

U.S. Pat. No. 5,534,592, discloses an initiator system which is comprised of (a) a lithium initiator, (b) a sodium alkoxide and (c) a polar modifier; wherein the molar ratio of the sodium alkoxide to the polar modifier is within the range of about 0.1:1 to about 10:1; and wherein the molar ratio of the sodium alkoxide to the lithium initiator is within the range of about 0.01:1 to about 20:1.

SUMMARY OF THE INVENTION

It has been determined that certain 3,4-polyisoprene rubbers having a high glass transition temperature (Tg) can be used in tire tread rubber compositions to significantly improve traction characteristics without compromising tread wear or rolling resistance. These 3,4-polyisoprene rubbers have a Tg which is within the range of about 0° C. to about 25° C. and preferably have a Tg which is within the range of about 5° C. to about 20° C. Particularly good traction characteristics can be attained by utilizing a combination of both such a high Tg 3,4-polyisoprene and a conventional low Tg 3,4-polyisoprene in tire tread compounds.

The present invention more specifically discloses a pneumatic tire having an outer circumferential tread wherein said tread is a sulfur-cured rubber composition comprised of, based on 100parts by weight of rubber, (1) from about 20 to about 60 parts of natural rubber, (2) from about 5 to about 30 parts of high cis-1,4-polybutadiene rubber, (3) from about 210 to about 50 parts of styrene-butadiene rubber and (4) from about 5 to about 30 parts of 3,4-polyisoprene rubber, wherein the 3,4-polyisoprene rubber has (a) a 3,4-isomer content of from 75 percent to 95 percent, (b) a 1,2-isomer content of from 5 percent to 25 percent, (c) a glass transition temperature from 0° to 25° C. and (d) a number average molecular weight which is within the range of 30,000 to 180,000.

The subject invention also discloses a pneumatic tire having an outer circumferential tread wherein said tread is a sulfur-cured rubber composition comprised of, based on 100 parts by weight of rubber, (1) from about 20 to about 60 parts of natural rubber, (2) from about 5 to about 30 parts of high cis-1,4-polybutadiene rubber, (3) from about 10 to about 50 parts of styrene-butadiene rubber, (4) from about 2.5 to about 15 parts of a high Tg 3,4-polyisoprene rubber, wherein the high Tg 3,4-polyisoprene rubber has (a) a 3,4-isomer content of from 75 percent to 95 percent, (b) a 1,2-isomer content of from 5 percent to 25 percent, (c) a glass transition temperature from 0° to 25° C., and (d) a number average molecular weight which is within the range of 30,000 to 180,000, and (5) from about 2.5 to about 15 parts of a low Tg 3,4-polyisoprene rubber, wherein the low Tg 3,4-polyisoprene rubber has a glass transition temperature of less than about −5° C.

The present invention further reveals a method of improving the wet skid resistance of a rubber mixture for a tire tread, comprising adding from about 5 to about 50 parts by weight of a 3,4-polyisoprene rubber from 50 to 95 parts by weight of a sulfur-vulcanizable elastomer containing conventional fillers, oils, auxiliaries and vulcanizing agents, wherein said 3,4-polyisoprene rubber has (a) a 3,4-isomer content of from 75 percent to 95 percent, (b) a 1,2-isomer content of from 5 percent to 25 percent, (c) a glass transition temperature from 0° to 25° C. and (d) a number average molecular weight which is within the range of 30,000 to 180,000.

The subject invention also discloses a pneumatic tire having an outer circumferential tread wherein said tread is a sulfur-cured rubber composition comprised of, based on 100 parts by weight of rubber, (1) from about 5 to about 50 parts of 3,4-polyisoprene rubber, wherein said 3,4-polyisoprene rubber has (a) a 3,4-isomer content of from 75 percent to 95 percent, (b) a 1,2-isomer content of from 5 percent to 25 percent, (c) a glass transition temperature from 0° to 5° C. and (d) a number average molecular weight which is within the range of 30,000 to 180,000; and (2) from about 50 to about 95 parts of a rubbery polymer which is co-curable with the 3,4-polyisoprene rubber.

DETAILED DESCRIPTION OF THE INVENTION

The 3,4-polyisoprene rubbers which can be employed in the blends of this invention are typically synthesized by anionic polymerization in an organic medium. The polymerization is normally carried out in an inert organic medium utilizing a lithium catalyst. The 3,4-isomer content of the polyisoprene rubber made is controlled by the amount of modifier system present during the polymerization step.

The inert organic medium which is utilized as the solvent will typically be a hydrocarbon which is liquid at ambient temperatures which can be one or more aromatic, paraffinic or cycloparaffinic compounds. These solvents will normally contain from 4 to 10 carbon atoms per molecule and will be liquids under the conditions of the polymerization. It is, of course, important for the solvent selected to be inert. The term "inert" as used herein means that the solvent does not interfere with the polymerization reaction or react with the polymers made thereby. Some representative examples of suitable organic solvents include pentane, isooctane, cyclohexane, normal hexane, benzene, toluene, xylene, ethylbenzene and the like, alone or in admixture. Saturated aliphatic solvents, such as cyclohexane and normal hexane, are most preferred.

The lithium catalysts which can be used are typically organolithium compounds. The organolithium compounds which are preferred can be represented by the formula R-Li, wherein R represents a hydrocarbyl radical containing from 1 to about 20 carbon atoms. Generally, such monofunctional organolithium compounds will contain from 1 to about 10 carbon atoms. Some representative examples of organolithium compounds which can be employed include methyllithium, ethyllithium, isopropyllithium, n-butyllithium, sec-butyllithium, n-octyllithium, tert-octyllithium, n-decyllithium, phenyllithium, 1-napthyllithium, 4-butylphenyllithium, p-tolyllithium, 1-naphthyllithium, 4-butylphenyllithium, p-tolyllithium, 4-phenylbutyllithium, cyclohexyllithium, 4-butylcyclohexyllithium and 4-cyclohexylbutyllithium. Organo monolithium compounds, such as alkyllithium compounds and aryllithium compounds, are usually employed. Some representative examples of preferred organo monolithium compounds that can be utilized include ethylaluminum, isopropylaluminum, n-butyllithium, secondary-butyllithium, normal-hexyllithium, tertiary-octyllithium, phenyllithium, 2-napthyllithium, 4-butylphenyllithium, 4-phenylbutyllithium, cyclohexyllithium and the like. Normal-butyllithium and secondary-butyllithium are highly preferred lithium initiators.

The amount of lithium catalyst utilized will vary from one organolithium compound to another and with the molecular weight that is desired for the 3,4-polyisoprene rubber being synthesized. As a general rule in all anionic polymerizations, the molecular weight (Mooney viscosity) of the polymer produced is inversely proportional to the amount of catalyst utilized. Since the 3,4-polyisoprene of this invention is of a relatively low molecular weight, the amount of lithium initiator employed will be about three times as much as is used in synthesizing conventional 3,4-polyisoprene rubber. As a general rule, from about 0.02 phm (parts per hundred parts by weight of monomer) to about 1 phm of the lithium catalyst will be employed. In most cases, from about 0.03 phm to about 0.3 phm of the lithium catalyst will be employed. It is typically most preferred to utilize from 0.06 phm to 0.2 phm of the lithium catalyst.

Normally, from about 5 weight percent to about 35 weight percent of the isoprene monomer will be charged into the polymerization medium (based upon the total weight of the polymerization medium including the organic solvent and monomer). In most cases, it will be preferred for the polymerization medium to contain from about 10 weight percent to about 30 weight percent monomer. It is typically more preferred for the polymerization medium to contain from about 20 weight percent to about 25 weight percent monomer.

The isoprene will be polymerized at a temperature which is within the range of about 30° C. to about 100° C. The polymerization temperature will preferably be within the range of about 40° C. to about 70° C. for practical reasons and to attain the desired microstructure. Temperatures within the range of about 50° C. to about 60° C. are most preferred. The microstructure of the 3,4-polyisoprene rubber being prepared is somewhat dependent upon the polymerization temperature.

The polymerization is allowed to continue until essentially all of the isoprene monomer has been exhausted. In other words, the polymerization is allowed to run to completion. Since a lithium catalyst is employed to polymerize the isoprene monomer, a living 3,4-polyisoprene rubber is produced.

The living polyisoprene rubber synthesized will have a number average molecular weight which is within the range of about 30,000 to about 180,000 and a weight average molecular weight which is within the range of about 40,000 to about 300,000. The polyisoprene rubber synthesized will more typically have a number average molecular weight which is within the range of about 50,000 to about 150,000 and will preferably have a number average molecular weight which is within the range of about 70,000 to about 120,000.

The 3,4-polyisoprene rubber will typically have a high glass transition temperature which is within the range of about 0° C. to about 25° C. It will more typically have a glass transition temperature which is within the range of about 5° C. to about 20° C. The 3,4-polyisoprene rubber will generally have a 3,4-isomer content which is within the range of about 75 percent to about 95 percent and a 1,2-isomer content which is within the range of about 5 percent to about 25 percent.

A combination of a sodium alkoxide and polar modifier will normally be employed as the modifier system to attain the very high 3,4-isomer content and to greatly improve (increase) the rate of polymerization. It has been unexpectedly found that a combination of a sodium alkoxide and polar modifier acts synergistically to increase the 3,4-isomer content of polyisoprene rubber synthesized in its presence.

The molar ratio of the sodium alkoxide to the lithium initiator will normally be within the range of about 0.05:1 to about 3:1 and the molar ratio of the polar modifier to the lithium initiator will normally be within the range of about 0.25:1 to about 5:1. It is generally preferred for the molar ratio of the sodium alkoxide to the lithium initiator to be within the range of about 0.15:1 to about 1:1 and for the molar ratio of the polar modifier to the lithium initiator to be within the range of about 0.4:1 to about 3:1. It is generally more preferred for the molar ratio of the sodium alkoxide to the lithium initiator to be within the range of about 0.3:1 to about 0.5:1 and for the molar ratio of the polar modifier to the lithium initiator to be within the range of about 0.5:1 to about 2:1.

The sodium alkoxides which can be utilized in the modifier system will normally be of the formula NaOR, wherein R is an alkyl group containing from about 2 to about 12 carbon atoms. The sodium metal alkoxide will typically contain from about 2 to about 12 carbon atoms. It is generally preferred for the sodium alkoxide to contain from about 3 to about 8 carbon atoms. It is generally most preferred for the sodium alkoxide to contain from about 4 to about 6 carbon atoms. Sodium t-amyloxide (sodium t-pentoxide) is a representative example of a preferred sodium alkoxide which can be utilized in the modifier systems of this invention.

Ethers and tertiary amines which act as Lewis bases are representative examples of polar modifiers that can be utilized. Some specific examples of typical polar modifiers include diethyl ether, di-n-propyl ether, diisopropyl ether, di-n-butyl ether, tetrahydrofuran, dioxane, ethylene glycol dimethyl ether, ethylene glycol diethyl ether, diethylene glycol dimethyl ether, diethylene glycol diethyl ether, triethylene glycol dimethyl ether, trimethylamine, triethylamine, N,N,N',N'-tetramethylethylenediamine, N-methyl morpholine, N-ethyl morpholine, N-phenyl morpholine and the like.

The modifier can also be a 1,2,3-trialkoxybenzene or a 1,2,4-trialkoxybenzene. Some representative examples of 1,2,3-trialkoxybenzenes that can be used include 1,2,3-trimethoxybenzene, 1,2,3-triethoxybenzene, 1,2,3-tributoxybenzene, 1,2,3-trihexoxybenzene, 4,5,6-trimethyl-1,2,3-trimethoxybenzene, 4,5,6-tri-n-pentyl-1,2,3-triethoxybenzene, 5-methyl-1,2,3-trimethoxybenzene and 5-propyl-1,2,3-trimethoxybenzene. Some representative examples of 1,2,4-trialkoxybenzenes that can be used include 1,2,4-trimethoxybenzene, 1,2,4-triethoxybenzene, 1,2,4-tributoxybenzene, 1,2,4-tripentoxybenzene, 3,5,6-trimethyl-1,2,4-trimethoxybenzene, 5-propyl-1,2,4-trimethoxybenzene and 3,5-dimethyl-1,2,4-trimethoxybenzene. Dipiperidinoethane, dipyrrolidinoethane, tetramethylethylene diamine, diethylene glycol, dimethyl ether and tetrahydrofuran are representative of highly preferred modifiers. U.S. Pat. No. 4,022,959 describes the use of ethers and tertiary amines as polar modifiers in greater detail.

The utilization of 1,2,3-trialkoxybenzenes and 1,2,4-trialkoxybenzenes as modifiers is described in greater detail in U.S. Pat. No. 4,696,986. The teachings of U.S. Pat. Nos. 4,022,959 and 4,696,986 are incorporated herein by reference in their entirety.

The microstructure of the repeat units which are derived from isoprene monomer is a function of the polymerization temperature and the amount of modifier present. For example, it is known that higher temperatures result in lower 3,4-isomer contents (lower levels of 3,4-microstructure). Accordingly, the polymerization temperature, quantity of modifier and specific modifier selected will be determined with the ultimate desired microstructure of the polyisoprene rubber being synthesized being kept in mind.

Coupling agents can optionally be used in order to improve the cold flow characteristics of the rubber and rolling resistance of tires made therefrom. Coupling can also lead to better processability and other beneficial properties. A wide variety of compounds suitable for utilization as coupling agents can be employed. Some representative examples of suitable coupling agents include multivinylaromatic compounds, multiepoxides, multiisocyanates, multiimines, multialdehydes, multiketones, multihalides, multianhydrides, multiesters which are the esters of polyalcohols with monocarboxylic acids, and the diesters which are esters of monohydric alcohols with dicarboxylic acids, and the like.

Examples of suitable multivinylaromatic compounds include divinylbenzene, 1,2,4-trivinylbenzene, 1,3-divinylnaphthalene, 1,8-divinylnaphthalene, 1,3,5-trivinylnaphthalene, 2,4-divinylbiphenyl and the like. The divinylaromatic hydrocarbons are preferred, particularly divinylbenzene in either its ortho, meta or para isomer. Commercial divinylbenzene which is a mixture of the three isomers and other compounds is quite satisfactory.

While any multiepoxide can be used, it is preferred to use those which are liquid since they are more readily handled and form a relatively small nucleus for the radial polymer. Especially preferred among the multiepoxides are the epoxidized hydrocarbon polymers such as epoxidized liquid polybutadienes and the epoxidized vegetable oils such as epoxidized soybean oil and epoxidized linseed oil. Other epoxy compounds such as 1,2,5,6,9,10-triepoxydecane and the like, also can be used.

Examples of suitable multiisocyanates include benzene-1,2,4-triisocyanate, naphthalene-1,2,5,7-tetraisocyanate and the like. Especially suitable is a commercially available product known as PAPI-1, a polyarylpolyisocyanate having an average of three isocyanate groups per molecule and an average molecular weight of about 380. Such a compound can be visualized as a series of isocyanate-substituted benzene rings joined through methylene linkages.

The multiimines, which are also known as multiaziridinyl compounds, that can be employed are preferably those containing three or more aziridine rings per molecule. Examples of such compounds include the triaziridinyl phosphine oxides or sulfides such as tri(1-ariridinyl)phosphine oxide, tri(2-methyl-1-ariridinyl)phosphine oxide, tri(2-ethyl-3-decyl-1-ariridinyl)phosphine sulfide and the like.

The multialdehydes which can be utilized are represented by compounds such as 1,4,7-naphthalene tricarboxyaldehyde, 1,7,9-anthracene tricarboxyaldehyde, 1,1,5-pentane tricarboxyaldehyde and similar multialdehyde containing aliphatic and aromatic compounds. The multiketones are represented by compounds such as 1,4,9,10-anthraceneterone, 2,3-diacetonylcyclohexanone and the like. Examples of the multianhydrides include pyromellitic dianhydride, styrene-maleic anhydride copolymers and the like. Examples of the multiesters include diethyladipate, triethylcitrate, 1,3,5-tricarbethoxybenzene and the like.

The preferred multihalides are silicon tetrahalides, such as silicon tetrachloride, silicon tetrabromide and silicon tetraiodide, and the trihalosilanes, such as trifluorosilane, trichlorosilane, trichloroethylsilane, tribromobenzylsilane, and the like. Also preferred are the multihalogen-substituted hydrocarbons, such as 1,3,5-tri(bromomethyl)benzene, 2,4,6,9-tetrachloro-3,7-decadiene and the like, in which the halogen is attached to a carbon atom which is alpha to an activating group such as an ether linkage, a carbonyl group or a carbon-to-carbon double bond. Substituents inert with respect to lithium atoms in the terminally reactive polymer can also be present in the active halogen-containing compounds. Alternatively, other suitable reactive groups different from the halogen as described above can be present.

Examples of compounds containing more than one type of functional group include 1,3-dichloro-2-propanone, 2,2-dibromo-3-decanone, 3,5,5-trifluoro-4-octanone, 2,4-dibromo-3-pentanone, 1,2,4,5-diepoxy-3-pentanone, 1,2,4,5-diepoxy-3-hexanone, 1,2,11,12-diepoxy-8-pentadecanone, 1,3,18,19-diepoxy-7,14-eicosanedione and the like.

In addition to the silicon multihalides as described hereinabove, other metal multihalides, particularly those of tin, lead or germanium, also can be readily employed as coupling and branching agents. Difunctional counterparts of these agents also can be employed, whereby a linear polymer rather than a branched polymer results.

Broadly, and exemplarily, a range of about 0.01 to 4.5 milliequivalents of coupling agent can be employed per 100 grams of polymer. It is normally preferred to use about 0.01 to 1.5 milliequivalents of coupling agent per 100 grams of polymer. The larger quantities tend to result in production of polymers containing terminally reactive groups or insufficient coupling. One equivalent of treating agent per equivalent of lithium is considered an optimum amount for maximum branching, if this result is desired in the production line. The coupling agent can be added in hydrocarbon solution, e.g., in cyclohexane, to the polymerization admixture in the final reactor with suitable mixing for distribution and reaction.

The polymerization can be terminated with a conventional noncoupling type of terminator, such as water, an acid, a lower alcohol and the like or with a coupling agent. After the copolymerization has been completed, the 3,4-polyisoprene rubber can be recovered from the organic solvent. The 3,4-polyisoprene rubber can be recovered from the organic solvent and residue by any means, such as decantation, filtration, centrification and the like. It is often desirable to precipitate the polybutadiene rubber from the organic solvent by the addition of lower alcohols containing from about 1 to about 4 carbon atoms to the polymer solution. Suitable lower alcohols for precipitation of the 3,4-polyisoprene rubber from the polymer cement include methanol, ethanol, isopropyl alcohol, normal-propyl alcohol and t-butyl alcohol. The utilization of lower alcohols to precipitate the 3,4-polyisoprene rubber from the polymer cement also "kills" the living polymer by inactivating lithium end groups. After the 3,4-polyisoprene rubber is recovered from the solution, steam-stripping can be employed to reduce the level of volatile organic compounds in the polymer. In the alternative, it may be desirable to remove residual organic solvent from the polymer by evaporation which can be facilitated by the application of vacuum and elevated temperatures.

There are valuable benefits associated with utilizing the high Tg 3,4-polyisoprene rubber of this invention in making tire tread compounds. For instance, traction characteristics can be significantly improved without compromising tread wear or rolling resistance. As a general rule, from about 5 v phr (parts per 100 parts of rubber) to about 50 phr of the high Tg 3,4-polyisoprene will be included in tire tread compounds. Normally, such tire tread compounds will contain from about 10 phr to 25 phr of the high Tg 3,4-polyisoprene. It is typically more preferred for tire tread compounds to contain from about 12 phr to about 20 phr of the high Tg 3,4-polyisoprene rubber. Such tire tread compounds will, of course, also contain at least one other rubber which is co-curable with the 3,4-polyisoprene. Some representative examples of other rubbers which are cocurable with the 3,4-polyisoprene rubber include natural rubber, high cis-1,4-polybutadiene rubber, high vinyl polybutadiene rubber, medium vinyl polybutadiene rubber, high trans-1,4-polybutadiene rubber, solution styrene-butadiene rubber, emulsion styrene-butadiene rubber, styrene-isoprene-butadiene rubber, styrene-isoprene rubber, isoprene-butadiene rubber and other types of 3,4-polyisoprene rubber.

A preferred blend for high performance automobile tires is comprised of, based on 100 parts by weight of rubber, (1) from about 20 to about 60 parts of natural rubber, (2) from about 5 to about 30 parts of high cis-1,4-polybutadiene rubber, (3) from about 10 to about 50 parts of styrene-butadiene rubber and (4) from about 5 to about 30 parts of the high Tg 3,4-polyisoprene rubber of this invention. It is preferred for this blend to contain (1) from about 30 to about 50 parts of natural rubber, (2) from about 10 to about 20 parts of high cis-1,4-polybutadiene rubber, (3) from about 20 to about 40 parts of styrene-butadiene rubber and (4) from about 10 to about 20 parts of the high Tg 3,4-polyisoprene rubber. It is more preferred for this tire tread rubber formulation to contain (1) from about 35 to about 45 parts of natural rubber, (2) from about 10 to about 20 parts of high cis-1,4-polybutadiene rubber, (3) from about 25 to about 35 parts of styrene-butadiene rubber and (4) from about 10 to about 20 parts of the high Tg 3,4-polyisoprene rubber. In these compounds, it is normally preferred for the styrene-butadiene rubber to be a solution styrene-butadiene rubber (a styrene-butadiene rubber which was synthesized by solution polymerization).

High cis-1,4-polybutadiene rubber which is suitable for use in such blends typically has a cis-isomer content of greater than 90 percent and can be made by the process described in Canadian Patent 1,236,648. High cis-1,4-polybutadiene rubber which is suitable for employment in such blends is also sold by The Goodyear Tire & Rubber Company as Budene® 1207 polybutadiene rubber and Bedene® 1208 polybutadiene rubber.

In order to maximize tire performance characteristics, a combination of the high Tg 3,4-polyisoprene and a low Tg 3,4-polyisoprene can be employed in the tire tread compound. The low Tg 3,4-polyisoprene will have a Tg of less than about −5° C. The low Tg 3,4-polyisoprene will typically have a Tg which is within the range of about −55° C. to about −5° C. It will preferably have a Tg which is within the range of about −30° C. to about −10° C. and will most preferably have a Tg which is within the range of about −20° C. to about −10° C. The low Tg 3,4-polyisoprene will also typically have a number average molecular weight of greater than about 200,000. The low Tg 3,4-polyisoprene will generally have a number average molecular weight which is within the range of about 200,000 to about 500,000 and will preferably have a number average molecular weight which is within the range of about 250,000 to about 400,000.

The weight ratio of high Tg 3,4-polyisoprene to low Tg 3,4-polyisoprene will typically be within the range of about 0.1:1 to about 10:1. It is normally preferred for the weight ratio of high Tg 3,4-polyisoprene to low Tg 3,4-polyisoprene to be within the range of about 0.5:1 to about 2:1. It is generally most preferred for the weight ratio of high Tg 3,4-polyisoprene to low Tg 3,4-polyisoprene to be within the range of about 0.8:1 to about 1.2:1. The high Tg 3,4-polyisoprene and low Tg 3,4-polyisoprene will normally be used in essentially equal amounts to attain optimal results.

A highly preferred blend for high performance automobile tires is comprised of, based on 100 parts by weight of rubber, (1) from about 20 to about 60 parts of natural rubber, (2) from about 5 to about 30 parts of high cis-1,4-polybutadiene rubber, (3) from about 10 to about 50 parts of styrene-butadiene rubber, (4) from about 2.5 to about 15 parts of the high Tg 3,4-polyisoprene rubber and (5) from about 2.5 to about 15 parts of a low Tg 3,4-polyisoprene rubber. It is preferred for this blend to contain (1) from about 30 to about 50 parts of natural rubber, (2) from about 10 to about 20 parts of high cis-1,4-polybutadiene rubber, (3) from about 20 to about 40 parts of styrene-butadiene rubber, (4) from about 5 to about 10 parts of the high Tg 3,4-polyisoprene rubber and (5) from about 5 to about 10 parts of a low Tg 3,4-polyisoprene rubber. It is more preferred for this tire tread rubber formulation to contain (1) from about 35 to about 45 parts of natural rubber, (2) from about 10 to about 20 parts of high cis-1,4-polybutadiene rubber, (3) from about 25 to about 35 parts of styrene-butadiene rubber, (4) from about 5 to about 10 parts of the high Tg 3,4-polyisoprene rubber and (5) from about 5 to about 10 parts of a low Tg 3,4-polyisoprene rubber.

In cases where it is desirable to maximize tire traction characteristics, the high cis-1,4-polybutadiene rubber can be eliminated from the blend. However, it should be appreciated that in such cases tread wear characteristics may be compromised to some degree. In any case, outstanding tire tread compounds for high performance tires can be made by blending, based on 100 parts by weight of rubber, (1) from about 20 to about 60 parts of natural rubber, (2) from about 10 to about 50 parts of styrene-butadiene rubber and (3) from about 10 to about 30 parts of the high Tg 3,4-polyisoprene rubber of this invention. In another scenario, the blend could be comprised of, based on 100 parts by weight of rubber, (1) from about 20 to about 60 parts of natural rubber, (2) from about 10 to about 50 parts of styrene-butadiene rubber, (3) from about 5 to about 15 parts of the high Tg 3,4-polyisoprene rubber and (4) from about 5 to about 15 parts of a low Tg 3,4-polyisoprene.

In cases where tread wear and rolling resistance are of greater importance, the styrene-butadiene can be eliminated from the blend. However, it should be appreciated that in such cases traction characteristics may be compromised to some degree. Tire tread compounds of this type can be made by blending, based on 100 parts by weight of rubber, (1) from about 20 to about 60 parts of natural rubber, (2) from about 10 to about 30 parts of high cis-1,4-polybutadiene rubber and (3) from about 10 to about 30 parts of the high Tg 3,4-polyisoprene rubber of this invention. In another scenario, the blend could be comprised of, based on 100 parts by weight of rubber, (1) from about 20 to about 60 parts of natural rubber, (2) from about 10 to about 50 parts of high cis-1,4-polybutadiene rubber, (3) from about 5 to about 15 parts of the high Tg 3,4-polyisoprene rubber and (4) from about 5 to about 15 parts of a low Tg 3,4- polyisoprene.

The 3,4-polyisoprene rubber containing blends of this invention can be compounded utilizing conventional ingredients and standard techniques. For instance, the polyisoprene rubber blends will typically be mixed with carbon black and/or silica, sulfur, fillers, accelerators, oils, waxes, scorch inhibiting agents and processing aids. In most cases, the 3,4-polyisoprene rubber blends will be compounded with sulfur and/or a sulfur containing compound, at least one filler, at least one accelerator, at least one antidegradant, at least one processing oil, zinc oxide, optionally a tackifier resin, optionally a reinforcing resin, optionally one or more fatty acids, optionally a peptizer and optionally one or more scorch inhibiting agents. Such blends will normally contain from about 0.5 to 5 phr (parts per hundred parts of rubber by weight) of sulfur and/or a sulfur containing compound with 1 phr to 2.5 phr being preferred. It may be desirable to utilize insoluble sulfur in cases where bloom is a problem.

Normally from 10 to 150 phr of at least one filler will be utilized in the blend with 30 to 80 phr being preferred. In most cases, at least some carbon black will be utilized in the filler. The filler can, of course, be comprised totally of carbon black. Silica can be included in the filler to improve tear resistance and heat build-up. Clays and/or talc can be included in the filler to reduce cost. The blend will also normally include from 0.1 to 2.5 phr of at least one accelerator with 0.2 to 1.5 phr being preferred. Antidegradants, such as antioxidants and antiozonants, will generally be included in the tread compound blend in amounts ranging from 0.25 to 10 phr with amounts in the range of 1 to 5 phr being preferred. Processing oils will generally be included in the blend in amounts ranging from 2 to 100 phr with amounts ranging from 5 to 50 phr being preferred. The polybutadiene blends of this invention will also normally contain from 0.5 to 10 phr of zinc oxide with 1 to 5 phr being preferred. These blends can optionally contain from 0 to 10 phr of tackifier resins, 0 to 10 phr of reinforcing resins, 1 to 10 phr of fatty acids, 0 to 2.5 phr of peptizers and 0 to 1 phr of scorch inhibiting agents.

To fully realize the total advantages of the blends of this invention, silica will normally be included in the tread rubber formulation. The processing of the 3,4-polyisoprene rubber blend is normally conducted in the presence of a sulfur containing organosilicon compound to realize maximum benefits. Examples of suitable sulfur containing organosilicon compounds are of the formula:

$$Z\text{-Alk-}S_n\text{-Alk-}Z \qquad (I)$$

in which Z is selected from the group consisting of

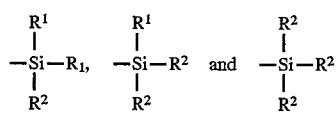

where $R^1$ is an alkyl group of 1 to 4 carbon atoms, cyclohexyl or phenyl; wherein $R^2$ is alkoxy of 1 to 8 carbon atoms or cycloalkoxy of 5 to 8 carbon atoms; and wherein Alk is a divalent hydrocarbon of 1 to 18 carbon atoms and n is an integer of 2 to 8.

Specific examples of sulfur containing organosilicon compounds which may be used in accordance with the present invention include: 3,3'-bis(trimethoxysilylpropyl) disulfide, 3,3'-bis(triethoxysilylpropyl) tetrasulfide, 3,3'-bis(triethoxysilylpropyl) octasulfide, 3,3'-bis(trimethoxysilylpropyl) tetrasulfide, 2,2'-bis(triethoxysilylethyl) tetrasulfide, 3,3'-bis(trimethoxysilylpropyl) trisulfide, 3,3'-bis(triethoxysilylpropyl) trisulfide, 3,3'-bis(tributoxysilylpropyl) disulfide, 3,3'-bis(trimethoxysilylpropyl) hexasulfide, 3,3'-bis(trimethoxysilylpropyl) octasulfide, 3,3'-bis(trioctoxysilylpropyl) tetrasulfide, 3,3'-bis(trihexoxysilylpropyl) disulfide, 3,3'-bis(tri-2"-ethylhexoxysilylpropyl) trisulfide, 3,3'-bis(triisooctoxysilylpropyl) tetrasulfide, 3,3'-bis(tri-t-butoxysilylpropyl) disulfide, 2,2'-bis(methoxydiethoxysilylethyl) tetrasulfide, 2,2'-bis(tripropoxysilylethyl) pentasulfide, 3,3'-bis(tricyclonexoxysilylpropyl) tetrasulfide, 3,3'-bis(tricyclopentoxysilylpropyl) trisulfide, 2,2'-bis(tri-2"-methylcyclohexoxysilylethyl) tetrasulfide, bis(trimethoxysilylmethyl) tetrasulfide, 3-methoxy ethoxy propoxysilyl 3'-diethoxybutoxy-silylpropyltetrasulfide, 2,2'-bis(dimethyl methoxysilylethyl) disulfide, 2,2'-bis(dimethyl sec.butoxysilylethyl) trisulfide, 3,3'-bis(methyl butylethoxysilylpropyl) tetrasulfide, 3,3'-bis(di t-butylmethoxysilylpropyl) tetrasulfide, 2,2'-bis(phenyl methyl methoxysilylethyl) trisulfide, 3,3'-bis(diphenylisopropoxysilylpropyl) tetrasulfide, 3,3'-bis(diphenyl cyclohexoxysilylpropyl) disulfide, 3,3'-bis(dimethyl ethylmercaptosilylpropyl) tetrasulfide, 2,2'-bis(methyl dimethoxysilylethyl) trisulfide, 2,2'-bis(methyl ethoxypropoxysilylethyl) tetrasulfide, 3,3'-bis(diethyl methoxysilylpropyl) tetrasulfide, 3,3'-bis(ethyl di-sec. butoxysilylpropyl) disulfide, 3,3'-bis(propyl diethoxysilylpropyl) disulfide, 3,3'-bis(butyl dimethoxysilylpropyl) trisulfide, 3,3'-bis(phenyl dimethoxysilylpropyl) tetrasulfide, 3-phenyl ethoxybutoxysilyl 3'-trimethoxysilylpropyl tetrasulfide, 4,4'--bis(trimethoxysilylbutyl) tetrasulfide, 6,6'-bis(triethoxysilylhexyl) tetrasulfide, 12,12'-bis(triisopropoxysilyl dodecyl) disulfide, 18,18'-bis(trimethoxysilyloctadecyl) tetrasulfide, 18,18'-bis(tripropoxysilyloctadecenyl) tetrasulfide, 4,4'--bis(trimethoxysilyl-buten-2-yl) tetrasulfide, 4,4'--bis(trimethoxysilylcyclohexylene) tetrasulfide, 5,5'-bis(dimethoxymethylsilylpentyl) trisulfide, 3,3'-bis(trimethoxysilyl-2-methylpropyl) tetrasulfide and 3,3'-bis(dimethoxyphenylsilyl-2-methylpropyl) disulfide.

The preferred sulfur containing organosilicon compounds are the 3,3'-bis(trimethoxy or triethoxy silylpropyl) sulfides. The most preferred compound is 3,3'-bis(triethoxysilylpropyl) tetrasulfide. Therefore, as to formula I, preferably Z is

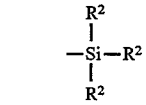

where $R^2$ is an alkoxy of 2 to 4 carbon atoms, with 2 carbon atoms being particularly preferred; Alk is a divalent hydrocarbon of 2 to 4 carbon atoms with 3 carbon atoms being particularly preferred; and n is an integer of from 3 to 5 with 4 being particularly preferred.

The amount of the sulfur containing organosilicon compound of formula I in a rubber composition will vary depending on the level of silica that is used. Generally speaking, the amount of the compound of formula I will range from about 0.01 to about 1.0 parts by weight per part by weight of the silica. Preferably, the amount will range from about 0.02 to about 0.4 parts by weight per part by weight of the silica. More preferably, the amount of the compound of formula I will range from about 0.05 to about 0.25 parts by weight per part by weight of the silica.

In addition to the sulfur containing organosilicon, the rubber composition should contain a sufficient amount of silica and carbon black, if used, to contribute a reasonably high modulus and high resistance to tear. The silica filler may be added in amounts ranging from about 10 phr to about 250 phr. Preferably, the silica is present in an amount ranging from about 15 phr to about 80 phr. If carbon black is also present, the amount of carbon black, if used, may vary. Generally speaking, the amount of carbon black will vary from about 5 phr to about 80 phr. Preferably, the amount of carbon black will range from about 10 phr to about 40 phr. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. In any case, the total quantity of silica and carbon black will be at least about 30 phr. The combined weight of the silica and carbon black, as hereinbefore referenced, may be as low as about 30 phr, but is preferably from about 45 to about 130 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc; silicas available from Rhone-Poulenc with, for example, the designation of Z1165MP; and silicas available from Degussa AG with, for example, designations VN2 and VN3.

Tire tread formulations which include silica and an organosilicon compound will typically be mixed utilizing a thermomechanical mixing technique. The mixing of the tire tread rubber formulation can be accomplished by methods known to those having skill in the rubber mixing art. For example, the ingredients are typically mixed in at least two stages, namely at least one non-productive stage followed by a productive mix stage. The final curatives including sulfur vulcanizing agents are typically mixed in the final stage which is conventionally called the "productive" mix stage in which the mixing typically occurs at a temperature, or ultimate temperature, lower than the mix temperature(s) than the preceding non-productive mix stage(s). The rubber, silica and sulfur containing organosilicon and carbon black, if used, are mixed in one or more non-productive mix stages. The terms "non-productive" and "productive" mix stages are well known to those having skill in the rubber mixing art. The sulfur vulcanizable rubber composition containing the sulfur containing organosilicon compound, vulcanizable rubber and generally at least part of the silica should be subjected to a thermomechanical mixing step. The thermomechanical mixing step generally comprises a mechanical working in a mixer or extruder for a period of time suitable in order to produce a rubber temperature between 140° C. and 190° C. The appropriate duration of the thermomechanical working varies as a function of the operating conditions and the volume and nature of the components. For example, the thermomechanical working may be for a duration of time which is within the range of about 2 minutes to about 20 minutes. It will normally be preferred for the rubber to reach a temperature which is within the range of about 145° C. to about 180° C. and to be maintained at said temperature for a period of time which is within the range of about 4 minutes to about 12 minutes. It will normally be more preferred for the rubber to reach a temperature which is within the range of about 155° C. to about 170° C. and to be maintained at said temperature for a period of time which is within the range of about 5 minutes to about 10 minutes.

The 3,4-polyisoprene rubber blend containing tire tread compounds of this invention can be used in tire treads in conjunction with ordinary tire manufacturing techniques. After the tire has been built with the 3,4-polyisoprene rubber containing blend, it can be vulcanized using a normal tire cure cycle. Tires made in accordance with this invention can be cured over a wide temperature range. However, it is generally preferred for the tires of this invention to be cured at a temperature ranging from about 132° C. (270° F.) to about 166° C. (330° F.). It is more typical for the tires of this invention to be cured at a temperature ranging from about 143° C. (290° F.) to about 154° C. (310° F.). It is generally preferred for the cure cycle used to vulcanize the tires of this invention to have a duration of about 10 to about 20 minutes with a cure cycle of about 12 to about 18 minutes being most preferred.

The 3,4-isomer content of the 3,4-polyisoprene referred to herein can be determined by nuclear magnetic resonance (NMR) spectroscopy. Glass transition temperatures can be determined by scanning calorimetry at a heating rate of 10° C./minute and number average molecular weight (Mn) can be determined by gel permeation chromatography.

This invention is illustrated by the following examples which are merely for the purpose of illustration and are not to be regarded as limiting the scope of the invention or the manner in which it can be practiced. Unless specifically indicated otherwise, parts and percentages are given by weight.

EXAMPLE 1

In this example, an isoprene rubber having a high Tg (glass transition temperature) and a low molecular weight was synthesized by the technique of this invention using a mixed tertiary amine and sodium-t-amylate (STA) as the modifier system. In the procedure used, 2,000 grams of a silica/molecular sieve/aluminum dried premix containing 17.8 weight percent of isoprene in hexanes was charged into a one-gallon (3.8 liters) reactor. After the impurity of the premix was removed by an n-butyl lithium (n-BuLi) solution, 3.56 ml (milliliters) of a 2.0M solution of TMEDA (N,N,N',N'-tetramethylethylenediamine in hexane), 3.56 ml of a 2.0M solution of STA (in hexane) and 3.60 ml of a 0.96M solution of n-BuLi (in hexane) were added to the reactor. The molar ratio of STA to TMEDA and to n-BuLi was 2:2:1. The target Mn (number averaged molecular weight) was 100,000. The polymerization was allowed to proceed at 40° C. for an hour. An analysis of the residual monomer indicated that isoprene was all consumed. Then, 2.0 ml of a 2M solution of ethanol (in hexane) was added to the reactor to shortstop the polymerization and the polymer was removed from the reactor and stabilized with 1 phr (parts per 100 parts by weight of rubber) of antioxidant.

After the hexane solvent was evaporated, the resulting isoprene rubber was dried in a vacuum oven at 50° C. The isoprene rubber was determined to have a Tg at +14° C. It was also determined to have a microstructure which contained 15 percent 1,2-polyisoprene units, 82 percent 3,4-polyisoprene units and 3 percent 1,4-polyisoprene units. The Mooney viscosity (ML 1+4) at 100° C. of the isoprene rubber made was determined to be 13. The molecular weight of this isoprene rubber was measured using GPC (gel permeation chromatography) to have an Mn (number averaged molecular weight) of 78,000 and an Mw (weight averaged molecular weight) of 99,000 and a molecular weight distribution (MWD) of 1.30.

EXAMPLE 2

The procedure described in Example 1 was utilized in this example except that the target number average molecular weight ($M_n$) of the isoprene rubber was increased from 100,000 to 200,000. To achieve this, the amount of the modifiers and n-BuLi was reduced to half; i.e., 1.78 ml of a 2M solution of STA, 1.78 ml of a 2M solution of TMEDA and 1.8 ml of a 0.96M solution of n-BuLi were used in this experiment. The isoprene rubber formed was determined to have a Tg at +18° C. It was also determined to have a microstructure which contained 15 percent 1,2-polyisoprene units, 79 percent 3,4-polyisoprene units and 6 percent 1,4-polyisoprene units. The Mooney viscosity (ML 1+4) at 100° C. of the isoprene rubber made was determined to be 37. The molecular weight of this isoprene rubber was measured using GPC to have a $M_n$ of 121,000 and a $M_w$ (weight averaged molecular weight) of 182,000 and a molecular weight distribution (MWD) of 1.50.

EXAMPLE 3

The procedure described in Example 1 was utilized in this example except that the STA to TMEDA to n-BuLi ratio was changed from 2:2:1 to 0.5:0.5:1. The isoprene rubber formed was determined to have a Tg at +10° C. It was also determined to have a microstructure which contained 12 percent 1,2-polyisoprene units, 73 percent 3,4-polyisoprene units and 12 percent 1,4-polyisoprene units. The Mooney viscosity (ML 1+4) at 100° C. of the isoprene rubber made was determined to be 9. The molecular weight of this isoprene rubber was measured using GPC (gel permeation chromatography) to have a $M_n$ (number averaged molecular weight) of 72,000 and a $M_w$ (weight averaged molecular weight) of 80,000 and a molecular weight distribution (MWD) of 1.12.

EXAMPLE 4

The procedure described in Example 1 was utilized in this example except that the STA to TMEDA to n-BuLi ratio was changed from 2:2:1 to 0.25:3:1 and the polymerization temperature was increased from 40° C. to 65° C. The GC (gas chromatography) analysis of the residual monomer indicated that 95 percent of isoprene monomer was consumed in 5 minutes. A complete monomer conversion was achieved after 20 minutes. The isoprene rubber produced was determined to have a Tg at +17° C. It was also determined to have a microstructure which contained 15 percent 1,2-polyisoprene units, 79 percent 3,4-polyisoprene units and 6 percent 1,4-polyisoprene units. The Mooney viscosity (ML 1+4) at 100° C. of the polyisoprene rubber made was determined to be 19. This polyisoprene rubber was measured to have a Mn of 72,400 and a Mw of 86,000 and a molecular weight distribution (MWD) of 1.20.

Comparative Example 6

The procedure described in Example 1 was utilized in this example except that the polymerization was changed from 40° C. to 30° C. and the modifier was changed from mixed TMEDA/STA to TMEDA alone. It took 280 minutes to convert 95 percent of isoprene monomer to polyisoprene rubber. The Tg, microstructure and Mooney viscosity of the polyisoprene rubber made are shown in Table 1.

Comparative Example 7

The procedure described in Example 1 was utilized in this example except that the polymerization temperature was decreased from 40° C. to 30° C. and except that the modifier was changed from a mixed TMEDA/STA to diglyme (2-methoxyethyl ether). It took 180 minutes to convert 95 percent of the isoprene monomer to polyisoprene rubber. The Tg and microstructure of the polyisoprene rubber made are shown in Table 1.

Comparative Example 8

The procedure described in Example 1 was utilized in this example except that the polymerization temperature employed was changed from 40° C. to 30° C. and the modifier was changed from mixed TMEDA/STA to ETE (ethyltetrahydrofurfuryl ether). It took 140 minutes to convert 95 percent of the isoprene monomer to polyisoprene rubber. The Tg, microstructure and Mooney ML-4 viscosity of the polyisoprene rubber made are shown in Table 1.

TABLE 1

| Ex. No. | Modifier | Time taken for 95% conv. | Tg | ML 1 + 4[1] | Microstructures 1,2-PI | 1,4-PI | 3,4-PI |
|---|---|---|---|---|---|---|---|
| 4 | STA/TMEDA | 5 min. | +17° C. | 19 | 15% | 6% | 79% |
| 5 | STA/TMEDA | 20 min. | +19° C. | 22 | 14% | 2% | 84% |
| 6 | TMEDA | 280 min. | +8° C. | 12 | 15% | 17% | 68% |
| 7 | Diglyme | 180 min. | +12° C. | 15 | 12% | 9% | 79% |
| 8 | ETE | 140 min. | +13° C. | 18 | 14% | 6% | 80% |

[1]The Mooney viscosity (ML 1 + 4) was measured at 100° C.

EXAMPLE 5

The procedure described in Example 1 was utilized in this example except that the polymerization was changed from 40° C. to 30° C. and the STA to TMEDA to n-BuLi ratio was changed from 2:2:1 to 0.25:3:1. It took 20 minutes to convert 95 percent of isoprene monomer to polyisoprene rubber. The microstructure and Mooney viscosity of the polyisoprene rubber made are shown in Table 1.

EXAMPLE 9

In this example, an isoprene rubber having an Mn of 300,000 was prepared by the technique of this invention using mixed tertiary amine and sodium-t-amylate (STA) as the modifier. In the procedure used, 2,250 grams of a silica/molecular sieve/aluminum dried premix containing 20 weight percent of isoprene in hexanes was charged into a one-gallon (3.8 liters) reactor. After the impurity of the premix was removed by a n-butyl lithium (n-BuLi) solution, 2.25 ml (milliliters) of a 2.0M solution of DPE (N,N'-1,2- diperidinoethan; in hexane), 1.5 ml of a 0.5M solution of STA (in hexane) and 1.56 ml of a 0.96M solution of n-BuLi (in hexane) were added to the reactor. The molar ratio of STA to DPE and to n-BuLi was 0.5:3:1. The polymerization was allowed to proceed at 50° C. An analysis of the residual monomer indicated that the polymerization was essentially complete (more than 95 percent of isoprene was consumed) after 30 minutes. The polymerization was continued for another 30 minutes for complete consumption of monomer. Then, 1.0 ml of a 2M solution of ethanol (in hexane) was added to the reactor to shortstop the polymerization and the polymer was removed from the reactor and stabilized with 1 phr (parts per 100 parts by weight of rubber) of antioxidant.

After the hexane solvent was evaporated, the resulting isoprene rubber was dried in a vacuum oven at 50° C. The isoprene rubber formed was determined to have a Tg at +30° C. It was also determined to have a microstructure which contained 89 percent 3,4-polyisoprene units, 9 percent 1,2-polyisoprene units and 2 percent 1,4-polyisoprene units.

EXAMPLE 10

The procedure described in Example 9 was utilized in this example except that 1,3-butadiene was used as the monomer in place of isoprene. It took 15 minutes to convert 95 percent of 1,3-butadiene monomer to butadiene rubber. The polybutadiene formed was determined to have a Tg at −9° C. It was also determined to have a microstructure which contained 93 percent 1,2-polybutadiene units and 7 percent 1,4-polybutadiene units.

Comparative Example 11

The procedure described in Example 9 was utilized in this example except that the polymerization temperature was changed from 50° C. to 70° C. and the modifier was changed from STA/DPE to TMEDA alone. The Tg of the polyisoprene formed and the time needed to consume more than 90 percent of the monomer charged are listed in TABLE 2.

Comparative Example 12

The procedure described in Example 9 was utilized in this example except that the polymerization temperature was changed from 50° C. to 70° C. and the modifier was changed from STA/DPE to ETE alone. The Tg of the polyisoprene formed and the time needed to consume more than 90 percent of the monomer charged are listed in TABLE 2.

EXAMPLE 13

The procedure described in Example 9 was utilized in this example except that the polymerization temperature was changed from 50° C. to 70° C. and the modifiers was changed from STA/DPE to STA/TMEDA. The Tg of the polyisoprene formed and the time needed to consume more than 90 percent of the monomer charged are listed in TABLE 2.

EXAMPLE 14

The procedure described in Example 9 was utilized in this example except that the polymerization temperature was changed from 50° C. to 70° C. and the modifiers was changed from STA/DPE to STA/ETE. The Tg of the polyisoprene formed and the time needed to consume more than 90 percent of the monomer charged are listed in TABLE 2.

TABLE 2

| Ex. No. | Modifier System | PZN Temp | Tg | Time needed to reach 90+% Conversion |
| --- | --- | --- | --- | --- |
| 11 | TMEDA | 70° C. | −16° C. | 240 minutes |
| 12 | ETE | 70° C. | −15° C. | 30 minutes |
| 13 | STA/ETE | 70° C. | −3° C. | 20 minutes |
| 14 | STA/TMEDA | 70° C. | 0° C. | 15 minutes |

Comparative Example 15

The procedure described in Example 9 was utilized in this example except that 1,3-butadiene was used as monomer in place of isoprene and the modifier was changed from STA/DPE to TMEDA alone. The Tg of the polybutadiene formed and the time needed to consume more than 90 percent of the monomer charged are listed in TABLE 3.

Comparative Example 16

The procedure described in Example 9 was utilized in this example except that 1,3-butadiene was used as monomer in place of isoprene and the modifier was changed from STA/DPE to ETE alone. The Tg of the polybutadiene formed and the time needed to consume more than 90 percent of the monomer charged are listed in TABLE 3.

EXAMPLE 17

The procedure described in Example 9 was utilized in this example except that 1,3-butadiene was used as the monomer in place of isoprene and the modifiers was changed from STA/DPE to STA/TMEDA. The Tg of the polybutadiene formed and the time needed to consume more than 90 percent of the monomer charged are listed in TABLE 3.

TABLE 3

| Ex. No. | Modifier System | PZN Temp | Tg | Time needed to reach 90+% Conversion |
| --- | --- | --- | --- | --- |
| 15 | TMEDA | 50° C. | −40° C. | 60 minutes |
| 16 | ETE | 50° C. | −36° C. | 45 minutes |
| 17 | STA/TMEDA | 50° C. | −22° C. | 15 minutes |

Comparative Example 18

The procedure described in Example 9 was utilized in this example except that a premix containing 50:50 mixture of 1,3-butadiene and isoprene in hexanes was used in place of isoprene and the modifier was changed from STA/DPE to TMEDA alone. The Tg of the 50/50 IBR (isoprene-butadiene rubber) formed and the time needed to consume more than 90 percent of the monomers charged are listed in TABLE 4.

Comparative Example 19

The procedure described in Example 9 was utilized in this example except that a premix containing 50:50 mixture of 1,3-butadiene and isoprene in hexanes was used in place of isoprene and the modifier was changed from STA/DPE to ETE alone. The Tg of the 50/50 IBR formed and the time needed to consume more than 90 percent of the monomers charged are listed in TABLE 4.

EXAMPLE 20

The procedure described in Example 9 was utilized in this example except that a premix containing 50:50 mixture of 1,3-butadiene and isoprene in hexanes was used in place of isoprene and the modifier was changed from STA/DPE to STA/ETE. The Tg of the 50/50 IBR formed and the time needed to consume more than 90 percent of the monomers charged are listed in TABLE 4.

EXAMPLE 21

The procedure described in Example 9 was utilized in this example except that a premix containing 50:50 mixture of 1,3-butadiene and isoprene in hexanes was used in place of isoprene and the modifier was changed from STA/DPE to STA/TMEDA. The Tg of the 50/50 IBR formed and the time needed to consume more than 90 percent of the monomers charged are listed in TABLE 4.

from STA/DPE to Sparteine alone. The Tg, microstructure, Mooney viscosity (ML 1+4) of the polyisoprene formed and the time needed to consume more than 90 percent of the monomer charged are listed in TABLE 5.

EXAMPLE 24

The procedure described in Example 9 was utilized in this example except that the polymerization temperature was changed from 50° C. to 70° C. and the modifier was changed from STA/DPE to STA/DMAMP. The Tg microstructure, Mooney viscosity (ML 1+4) of the polyisoprene formed and the time needed to consume more than 90 percent of the monomer charged are listed in TABLE 5.

EXAMPLE 25

The procedure described in Example 9 was utilized in this example except that the polymerization temperature was changed from 50° C. to 70° C. and the modifier was changed from STA/DPE to STA/Sparteine. The Tg, microstructure, Mooney viscosity (ML 1+4) of the polyisoprene formed and the time needed to consume more than 90 percent of the monomer charged are listed in TABLE 5.

TABLE 5

| Ex. No. | Modifier System | PZN Temp | Tg | ML 1 + 4[1] | Microstructure | | | Time needed for 90 + % Conversion |
|---|---|---|---|---|---|---|---|---|
| | | | | | 1,2-PI | 1,4-PI | 3,4-PI | |
| 22 | DMAMP | 70° C. | −32° C. | 43 | 2 | 54 | 44 | 120 minutes |
| 23 | Sparteine | 70° C. | −60° C. | 45 | 0 | 87 | 13 | 180 minutes |
| 24 | STA/DMAMP | 70° C. | −2° C. | 56 | 9 | 24 | 67 | 30 minutes |
| 25 | STA/Spartein | 70° C. | −12° C. | 43 | 5 | 36 | 59 | 45 minutes |

[1]The Mooney viscosity (ML 1 + 4) was measured at 100° C.

TABLE 4

| Ex. No. | Modifier System | PZN Temp | Tg | Time needed to reach 90+% Conversion |
|---|---|---|---|---|
| 18 | TMEDA | 65° C. | −26° C. | 210 minutes |
| 19 | ETE | 65° C. | −27° C. | 60 minutes |
| 20 | STA/ETE | 65° C. | −25° C. | 20 minutes |
| 21 | STA/TMEDA | 65° C. | −16° C. | 20 minutes |

Comparative Example 22

The procedure described in Example 9 was utilized in this example except that the polymerization temperature was changed from 50° C. to 70° C. and the modifier was changed from STA/DPE to DMAMP (2-dimethyl aminomethyl-1-methyl piperidine) alone. The Tg, microstructure, Mooney viscosity (ML 1+4) of the polyisoprene formed and the time needed to consume more than 90 percent of the monomer charged are listed in TABLE 5.

Comparative Example 23

The procedure described in Example 9 was utilized in this example except that the polymerization temperature was changed from 50° C. to 70° C. and the modifier was changed

EXAMPLE 26

The procedure described in Example 9 was utilized in this example except that a premix containing 10:90 mixture of styrene and 1,3-butadiene in hexanes was used in place of isoprene and the modifier was changed from STA/DPE to STA/TMEDA. It took 10 minutes to consume more than 90 percent of the monomers charged. The 10/90 SBR (styrene-butadiene rubber) produced was determine to have a Tg at −20° C. It was also determined to have a Mooney viscosity (ML 1+4) at 100° C. of 69.

Example 27-31

The procedure described in Example 9 was utilized in this example except that isoprene monomer was replaced with 25:75, 30:70, 35:65, 40:60 and 45:55 mixtures of styrene and 1,3-butadiene in hexanes and the modifier was changed from STA/DPE to STA/TMEDA. The STA to TMEDA and to n-BuLi ratio was also changed to 0.5:0.3:1. It took about 15 minutes to consume more than 90 percent of the monomers charged at the polymerization temperature of 70° C. for all these experiments. Based on proton NMR (nuclear magnetic resonance) measurements, the polystyrenes contained in these SBRs are randomly distributed in the polymer chains. The Tgs and microstructures of these SBRs made are listed in TABLE 6.

TABLE 6

| Ex. No. | Modifier System | Styrene:Butadiene Ratio | PZN Temp | Tg | Microstructure | | |
|---|---|---|---|---|---|---|---|
| | | | | | 1,2-PBd | 1,4-PBd | Styrene (Random) |
| 27 | STA/TMEDA | 25:75 | 70° C. | −35° C. | 39 | 36 | 25 |
| 28 | STA/TMEDA | 30:70 | 70° C. | −30° C. | 38 | 33 | 29 |
| 29 | STA/TMEDA | 35:65 | 70° C. | −27° C. | 32 | 34 | 34 |
| 30 | STA/TMEDA | 40:60 | 70° C. | −21° C. | 30 | 30 | 40 |
| 31 | STA/TMEDA | 45:55 | 70° C. | −13° C. | 28 | 28 | 44 |

EXAMPLE 32–32

The procedure described in Example 9 was utilized in this example except that isoprene monomer was replaced with 40:60 and 45:55 mixtures of styrene and 1,3-butadiene in hexanes and the modifier was changed from STA/DPE to STA/TMEDA. The STA to TMEDA and to n-BuLi ratio was also changed to 0.5:0.5:1. It took about 15 minutes to consume more than 90 percent of the monomers charged at the polymerization temperature of 70° C. for all these experiments. Based on proton NMR (nuclear magnetic resonance) measurements, the polystyrenes contained in these SBRs are randomly distributed in the polymer chains. The Tgs and microstructures of these SBRs made are listed in TABLE 7.

STA/ETE. The molar ratio of STA to ETE and to n-BuLi was 0.5:0.5:1. The microstructure of 25/75 SIR formed and the time needed to consume more than 90 percent of the monomers charged are listed in TABLE 8.

TABLE 7

| Ex. No. | Modifier System | Styrene:Butadiene Ratio | PZN Temp | Tg | Microstructure | | |
|---|---|---|---|---|---|---|---|
| | | | | | 1,2-PBd | 1,4-PBd | Styrene (Random) |
| 32 | STA/TMEDA | 40:60 | 70° C. | −12° C. | 35 | 26 | 39 |
| 33 | STA/TMEDA | 45:55 | 70° C. | −8° C. | 30 | 25 | 45 |

Comparative Example 34

The procedure described in Example 9 was utilized in this example except that a premix containing 25:75 mixture of styrene and 1,3-isoprene in hexanes was used in place of

TABLE 8

| Ex. No. | Modifier System | PZN Temp | Tg | Microstructure | | | | Time needed for 90 + % Conversion |
|---|---|---|---|---|---|---|---|---|
| | | | | 1,2-PI | 1,4-PI | 3,4-PI | Styrene | |
| 34 | ETE | 70° C. | −30° C. | 2 | 52 | 21 | 25 | 30 minutes |
| 35 | STA/ETE | 70° C. | −10° C. | 5 | 27 | 52 | 25 | 20 minutes | isoprene and the modifier was changed from STA/DPE to ETE alone. The molar ratio of ETE to n-BuLi was 0.5:1. The Tg, microstructure of 25/75 SIR (styrene-isoprene rubber) formed and the time needed to consume more than 90 percent of the monomers charged are listed in TABLE 8.

EXAMPLE 35

The procedure described in Example 9 was utilized in this example except that a premix containing 25:75 mixture of styrene and 1,3-isoprene in hexanes was used in place of isoprene and the modifier was changed from STA/DPE to Example 36–37

The procedure described in Example 9 was utilized in this example except that isoprene monomer was replaced with 10:90 mixture of styrene and isoprene in hexanes and the modifier was changed from STA/DPE to STA/TMEDA or STA/ETE. It took about 10 minutes to consume more than 90 percent of the monomers charged at the polymerization temperature of 70° C. for all these experiments. Based on proton NMR measurements, the polystyrenes contained in these SIRs are randomly distributed in the polymer chains. The Tgs and microstructures of these SIRs made are listed in TABLE 9.

TABLE 9

| Ex. No. | Modifier System | Styrene:Butadiene Ratio | PZN Temp | Tg | Microstructure | | | |
|---|---|---|---|---|---|---|---|---|
| | | | | | 1,2-PI | 1,4-PI | 3,4-PI | Styrene (Random) |
| 36 | STA/TMEDA | 10:90 | 70° C. | +14° C. | 12 | 10 | 68 | 10 |
| 37 | STA/ETE | 10:90 | 70° C. | +3° C. | 11 | 18 | 61 | 10 |

EXAMPLE 38

The procedure described in Example 9 was utilized in this example except that isoprene monomer was replaced with 25:50:25 mixture of styrene, isoprene and 1,3-butadiene in hexanes and the modifier was changed from STA/DPE to STA/ETE. It took about 12 minutes to consume more than 90 percent of the monomers charged at the polymerization temperature of 70° C. Based on proton NMR measurements, the polystyrenes contained in the SIBR (styrene-isoprene-butadiene rubber) are randomly distributed in the polymer chains. The SIBR made was determined to have a Tg at +1° C. It was also determined to have a microstructure which contained 24 percent polystyrene units, 13 percent 1,2-polybutadiene units, 9 percent 1,4-polybutadiene units, 7 percent 1,2-polyisoprene units, 11 percent 1,4-polyisoprene units and 36 percent 3,4-polyisoprene units. The SIBR was also measured to have a Mooney viscosity (ML 1+4) at 100° C. of 75.

Comparative Example 39

In this experiment, a blend was made by mixing 40 parts of natural rubber, 15 parts of high-cis-1,4-polybutadiene, 30 parts of solution styrene-butadiene rubber, 15 parts of a conventional low Tg 3,4-polyisoprene rubber, 38 parts of carbon black, 10 parts of Hi-Sil™ 210 silica, 2 parts of Degussa X50S coupling agent, 10 parts of a paraffinic process oil, 3.5 parts of antidegradants, 3.5 parts of zinc oxide, 2 parts of stearic acid, 1 part of N-cyclohexylbenzenethiazole-2-sulfenamide, 0.1 part of tetramethylthiuram disulfide, and 1.5 parts of sulfur. The low Tg 3,4-polyisoprene rubber utilized in this blend had a Tg of −16° C. and a number average molecular weight of about 350,000. This rubber blend was subsequently cured and evaluated for physical properties which are reported in TABLE 10.

Low tan delta values at 70° C. are indicative of low hysteresis and consequently tire treads made with such rubbers exhibit lower rolling resistance than tires made with rubbers having higher tan delta values at 70° C. On the other hand, rubbers which have high tan delta values between −25° C. and +25° C. can be utilized in making tire treads which exhibit better traction characteristics than tires made with tread rubber compositions which have lower tan delta values over the −25° C. to +25° C. temperature range. It is preferred for a tread rubber composition to have the highest possible tan delta value at every temperature within the range of −25° C. to +25° C. to realize the best possible traction characteristics over all driving conditions and at all driving speeds.

The rubber blend made in this experiment had a high tan delta value of greater than about 0.25 at temperatures of less than about −15° C. However, the tan delta values of this blend dropped rapidly with increasing temperatures above −10° C. At 0° C., this blend exhibited a tan delta value of about 0.18.

This experiment shows that conventional low Tg 3,4-polyisoprene rubber can be used in making tire tread formulations which have high tan delta values at temperatures of less than about 0° C. The low tan delta value at 70° C. of less than 0.1 further shows that this rubber formulation can be used to make tire treads which exhibit good rolling resistance. However, it would be highly desirable for the tan delta value of this rubber blend to be higher at temperatures within the range of about 0° C. to about 25° C. to exhibit outstanding traction characteristics over all driving conditions and at all driving speeds.

EXAMPLE 40

In this experiment, a tire tread rubber formulation was made using the same procedure as was employed in Example 39 except for the fact that a high Tg 3,4-polyisoprene rubber was substituted for the low Tg 3,4-polyisoprene rubber utilized in Example 39. The high Tg 3,4-polyisoprene rubber employed in this experiment had a $M_n$ of 121,000, a $M_w$ of 182,000 and a $M_z$ of 245,000. It was synthesized by the procedure described in Example 2.

The rubber formulation made in this experiment had the physical properties reported in TABLE 10. As can be seen, the tan delta values of the blend increased over the temperature range from about −2° C. to about +23° C. This blend has a tan delta value at 70° C. of about 0.07. This low tan delta value at 70° C. of less than 0.1 shows that this rubber formulation can be used to make tire treads which exhibit good rolling resistance. This unique combination of high tan delta values at low temperatures and low tan delta values at high temperatures is indicative of a tire tread formulation with both good traction characteristics and good rolling resistance.

Generally as the glass transition temperature of a tire tread rubber formulation increases abrasion resistance is sacrificed. However, it has been unexpectedly found that this is not the case with the tire tread rubber formulations of this invention. In fact, it has been determined that the tire tread rubber formulations of this invention have DIN abrasion characteristics which are as good as or better than the lower Tg control compounds. This means that better tread life can be expected while also attaining improved traction characteristics.

EXAMPLE 41

In this experiment, a tire tread rubber formulation was made using the same procedure as was employed in Example 39 except for the fact that a high Tg 3,4-polyisoprene rubber was substituted for the low Tg 3,4-polyisoprene rubber utilized in Example 39. The high Tg 3,4-polyisoprene rubber employed in this experiment had a $M_n$ of 72,000 and a $M_w$ of 86,000.

The rubber formulation made in this experiment had the physical properties reported in TABLE 10. As can be seen, the tan delta values of the blend increased over the temperature range from about −5° C. to about +17° C. This blend had a tan delta value at 70° C. of about 0.08. This low tan delta valued at 70° C. of less than 0.1 shows that this rubber formulation can be used to make tire treads which exhibit good rolling resistance. This unique combination of high tan delta values at low temperatures and low tan delta values at high temperatures is indicative of a tire tread formulation with both good traction characteristics and good rolling resistance.

Generally as the glass transition temperature of a tire tread rubber formulation increases abrasion resistance is sacrificed. However, it has been unexpectedly found that this is not the case with the tire tread rubber formulations of this invention. In fact, it has been determined that the tire tread rubber formulations of this invention have DIN abrasion characteristics which are as good as or better than the lower Tg control compounds. This means that better tread life can be expected while also attaining improved traction characteristics.

TABLE 10

| Example | 39 | 40 | 41 |
| --- | --- | --- | --- |
| 100% Modulus | 1.9 MPa | 2.0 MPa | 2.0 MPa |
| 300% Modulus | 8.5 MPa | 9.0 MPa | 8.7 MPa |
| Break Strength | 16.2 MPa | 14.6 MPa | 14.3 MPa |
| Elongation[1] | 515% | 469% | 469% |
| Hardness (20°C.) | 58 | 60 | 60 |
| Hardness (100°C.) | 52 | 52 | 51 |
| Rebound (20°C.) | 49 | 40 | 39 |
| Rebound (100°C.) | 67 | 66 | 65 |
| DIN Abrasion[2] | 116 | 105 | 111 |
| tan delta @ −25° C. | 0.28 | 0.20 | 0.21 |
| tan delta @ −20° C. | 0.26 | 0.17 | 0.18 |
| tan delta @ −15° C. | 0.25 | 0.15 | 0.16 |
| tan delta @ −10° C. | 0.24 | 0.14 | 0.15 |
| tan delta @ −5° C. | 0.22 | 0.14 | 0.15 |
| tan delta @ 0° C. | 0.18 | 0.14 | 0.15 |
| tan delta @ 5° C. | 0.16 | 0.14 | 0.17 |
| tan delta @ 10° C. | 0.13 | 0.16 | 0.21 |
| tan delta @ 15° C. | 0.12 | 0.19 | 0.23 |
| tan delta @ 20° C. | 0.11 | 0.23 | 0.23 |
| tan delta @ 25° C. | 0.10 | 0.23 | 0.19 |
| tan delta @ 70° C. | 0.07 | 0.07 | 0.08 |

[1]Elongation was measured to break.
[2]DIN Abrasion was measured as volume lost in cubic centimeters (lower is better).

While certain representative embodiments and details have been shown for the purpose of illustrating the subject invention, it will be apparent to those skilled in this art that various changes and modifications can be made therein without departing from the scope of the subject invention.

What is claimed is:

1. A pneumatic tire having an outer circumferential tread wherein said tread is a sulfur-cured rubber composition comprised of, based on 100 parts by weight of rubber, (1) from about 20 to about 60 parts of natural rubber, (2) from about 5 to about 30 parts of high cis-1,4-polybutadiene rubber, (3) from about 10 to about 50 parts of styrene-butadiene rubber and (4) from about 5 to about 30 parts of 3,4-polyisoprene rubber, wherein the 3,4-polyisoprene rubber has (a) a 3,4-isomer content of from 75 percent to 95 percent, (b) a 1,2-isomer content of from 5 percent to 25 percent, (c) a glass transition temperature from 5° to 25° C., and (d) a number average molecular weight which is within the range of 30,000 to 150,000.

2. A method of improving the wet skid resistance of a rubber mixture for a tire tread, comprising adding from about 5 to about 50 parts by weight of a 3,4-polyisoprene rubber from about 50 to about 95 parts by weight of a sulfur-vulcanizable elastomer containing conventional fillers, oils, auxiliaries and vulcanizing agents, wherein said 3,4-polyisoprene rubber has (a) a 3,4-isomer content of from 75 percent to 95 percent, (b) a 1,2-isomer content of from 5 percent to 25 percent, (c) a glass transition temperature from 5° to 25° C. and (d) a number average molecular weight which is within the range of 30,000 to 150,000.

3. A pneumatic tire having an outer circumferential tread wherein said tread is a sulfur-cured rubber composition comprised of, based on 100 parts by weight of rubber, (1) from about 5 to about 50 parts of 3,4-polyisoprene rubber, wherein said 3,4-polyisoprene rubber has (a) a 3,4-isomer content of from 75 percent to 95 percent, (b) a 1,2-isomer content of from 5 percent to 25 percent, (c) a glass transition temperature from 5° to 25° C. and (d) a number average molecular weight which is within the range of 30,000 to 150,000; and (2) from about 50 to about 95 parts of a rubbery polymer which is co-curable with the 3,4-polyisoprene rubber.

4. A pneumatic tire having an outer circumferential tread wherein said tread is a sulfur-cured rubber composition comprised of, based on 100 parts by weight of rubber, (1) from about 20 to about 60 parts of natural rubber, (2) from about 5 to about 30 parts of high cis-1,4-polybutadiene rubber, (3) from about 10 to about 50 parts of styrene-butadiene rubber, (4) from about 2.5 to about 15 parts of a high Tg 3,4-polyisoprene rubber, wherein the high Tg 3,4-polyisoprene rubber has (a) a 3,4-isomer content of from 75 percent to 95 percent, (b) a 1,2-isomer content of from 5 percent to 25 percent, (c) a glass transition temperature from 5° to 25° C. and (d) a number average molecular weight which is within the range of 30,000 to 150,000 and (5) from about 2.5 to about 15 parts of a low Tg 3,4-polyisoprene rubber, wherein the low Tg 3,4-polyisoprene rubber has a glass transition temperature of less than about −5° C.

5. A pneumatic tire as specified in claim 1 wherein the 3,4-polyisoprene has a weight average molecular weight which is within the range of about 40,000 to about 300,000.

6. A pneumatic tire as specified in claim 5 wherein the 3,4-polyisoprene has a number average. molecular weight which is within the range of about 50,000 to about 150,000.

7. A pneumatic tire as specified in claim 6 wherein the styrene-butadiene rubber is solution styrene-butadiene rubber.

8. A pneumatic tire as specified in claim 7 wherein the rubber composition contains from about 30 parts to about 50 parts of natural rubber, from about 10 parts to about 20 parts of high cis-1,4-polybutadiene rubber, from about 20 parts to about 40 parts of styrene-butadiene rubber and from about 10 parts to about 20 parts of the 3,4-polyisoprene rubber.

9. A pneumatic tire as specified in claim 8 wherein the 3,4-polyisoprene rubber has a glass transition temperature which is within the range of about 5° C. to about 20° C.

10. A pneumatic tire as specified in claim 9 wherein the rubber composition contains from about 35 parts to about 45 parts of natural rubber, from about 10 parts to about 20 parts of high cis-1,4-polybutadiene rubber, from about 25 parts to about 35 parts of styrene-butadiene rubber and from about 10 parts to about 20 parts of the 3,4-polyisoprene rubber.

11. A pneumatic tire as specified in claim 10 wherein the 3,4-polyisoprene has a number average molecular weight which is within the range of about 70,000 to about 120,000.

12. A pneumatic tire as specified in claim 4 wherein the low Tg 3,4-polyisoprene has a number average molecular weight of greater than 200,000.

13. A pneumatic tire as specified in claim 12 wherein the low Tg 3,4-polyisoprene has a glass transition temperature which is within the range of about −55° C. to about −5° C.

14. A pneumatic tire as specified in claim 13 wherein the blend contains (1) from about 30 to about 50 parts of the natural rubber, (2) from about 10 to about 20 parts of the high cis-1,4-polybutadiene rubber, (3) from about 20 to about 40 parts of the styrene-butadiene rubber, (4) from about 5 to about 10 parts of the high Tg 3,4-polyisoprene rubber and (5) from about 5 to about 10 parts of the low Tg 3,4-polyisoprene rubber.

15. A pneumatic tire as specified in claim 14 wherein the high Tg 3,4-polyisoprene has a weight average molecular weight which is within the range of about 40,000 to about 300,000.

16. A pneumatic tire as specified in claim 15 wherein the high Tg 3,4-polyisoprene has a number average molecular weight which is within the range of about 50,000 to about 150,000; and wherein the high Tg 3,4-polyisoprene rubber has a glass transition temperature which is within the range of about 5° C. to about 20° C.

17. A pneumatic tire as specified in claim 16 wherein the blend contains (1) from about 35 to about 45 parts of the natural rubber, (2) from about 10 to about 20 parts of the high cis-1,4-polybutadiene rubber, (3) from about 25 to about 35 parts of the styrene-butadiene rubber, (4) from about 5 to about 10 parts of the high Tg 3,4-polyisoprene rubber and (5) from about 5 to about 10 parts of the low Tg 3,4-polyisoprene rubber.

18. A pneumatic tire as specified in claim 3 wherein the rubbery polymer which is co-curable with the 3,4-polyisoprene is a mixture of natural rubber and styrene-butadiene rubber; and wherein the rubber composition is comprised of (1) from about 20 parts to about 60 parts of the natural rubber, (2) from about 10 to about 50 parts of the styrene-butadiene rubber and (3) from about 10 to about 30 parts of the 3,4-polyisoprene rubber.

19. A pneumatic tire as specified in claim 3 wherein the rubbery polymer which is co-curable with the 3,4-polyisoprene is a mixture of natural rubber, low Tg 3,4-polyisoprene rubber and styrene-butadiene rubber; wherein the rubber composition is comprised of (1) from about 20 parts to about 60 parts of the natural rubber, (2) from about 10 parts to about 50 parts of the styrene-butadiene rubber, (3) from about 5 parts to about 15 parts of the high Tg 3,4-polyisoprene rubber and (4) from about 5 parts to about 15 parts of a low Tg 3,4-polyisoprene rubber; and wherein the low Tg 3,4-polyisoprene rubber has a glass transition temperature which is within the range of about −55° C. to about −5° C.

20. A pneumatic tire as specified in claim 3 wherein the rubbery polymer which is co-curable with the 3,4-polyisoprene is a mixture of natural rubber and high cis-1,4-polybutadiene rubber; and wherein the rubber composition is comprised of (1) from about 20 parts to about 60 parts of the natural rubber, (2) from about 10 to about 30 parts of the high cis-1,4-polybutadiene rubber and (3) from about 10 to about 30 parts of the 3,4-polyisoprene rubber.

21. A pneumatic tire as specified in claim 3 wherein the rubbery polymer which is co-curable with the 3,4-polyisoprene is a mixture of natural rubber, low Tg 3,4-polyisoprene rubber and high cis-1,4-polybutadiene rubber; wherein the rubber composition is comprised of (1) from about 20 parts to about 60 parts of the natural rubber, (2) from about 10 parts to about 50 parts of the high cis-1,4-polybutadiene rubber, (3) from about 5 parts to about 15 parts of the high Tg 3,4-polyisoprene rubber and (4) from about 5 parts to about 15 parts of a low Tg 3,4-polyisoprene rubber; and wherein the low Tg 3,4-polyisoprene rubber has a glass transition temperature which is within the range of about −55° C. to about −5° C.

22. A pneumatic tire as specified in claim 21 wherein the high Tg 3,4-polyisoprene has a number average molecular weight which is within the range of about 50,000 to about 150,000; and wherein the high Tg 3,4-polyisoprene rubber has a glass transition temperature which is within the range of about 5° C. to about 20° C.

* * * * *